United States Patent [19]

Carpenter et al.

[11] 4,414,548

[45] Nov. 8, 1983

[54] DOPPLER SPEED SENSING APPARATUS

[75] Inventors: Daniel D. Carpenter, Manhattan Beach; Ronald L. Lanning, Rancho Palos Verdes, both of Calif.

[73] Assignee: TRW Inc., Cleveland, Ohio

[21] Appl. No.: 249,073

[22] Filed: Mar. 30, 1981

[51] Int. Cl.³ ............................................. G01S 9/44
[52] U.S. Cl. .................................. 343/8; 343/7 VM; 340/52 R
[58] Field of Search .................. 73/510, 503; 343/7 M, 343/8; 340/500, 554, 556; 324/160, 162

[56] References Cited

U.S. PATENT DOCUMENTS

| 2,251,973 | 8/1941 | Beale et al. | 73/503 |
|---|---|---|---|
| 3,028,592 | 4/1962 | Parr et al. | 343/8 |
| 3,131,390 | 4/1964 | Condie et al. | 343/8 |
| 3,462,586 | 8/1969 | Tholey et al. | 235/150.27 |
| 3,480,954 | 11/1969 | Gray et al. | 343/8 |
| 3,626,414 | 12/1971 | Valstar | 343/8 |
| 3,701,568 | 10/1972 | Lewis et al. | 343/8 |
| 3,810,176 | 5/1974 | Gray | 343/8 |
| 3,833,906 | 9/1974 | Augustine | 343/8 |
| 3,834,481 | 9/1974 | Carlson | 180/82 R |
| 3,859,660 | 1/1975 | Augustine | 343/8 |
| 4,050,071 | 9/1977 | Clorfeine | 343/8 |
| 4,086,563 | 4/1978 | Bachman | 340/52 B |
| 4,107,680 | 8/1978 | Kaplan | 343/8 |

OTHER PUBLICATIONS

Malmstadt, Enke and Toren, *Electronics for Scientists*, W. A. Benjamin, Inc., New York, 1963, pp. 190–192.
Doppler Navigation: Clegg and Thorne, "Proceedings of the Institution of Electrical Engineers," vol. 105, Part B, Suppl. No. 9, pp. 235–247, May 1958.

*Primary Examiner*—Maynard R. Wilbur
*Assistant Examiner*—M. Gordon
*Attorney, Agent, or Firm*—Yount & Tarolli

[57] ABSTRACT

A vehicle velocity sensing system is disclosed which includes a doppler velocity sensor (10, 12) and means for reducing spurious signal components in the output of the sensor. An accelerometer (30, 32) is mounted so as to sense vehicle accelerations along the boresight of the doppler velocity sensor. A processor (34, 36) processes the output of the accelerometer to provide a signal which corresponds essentially to the spurious components of the output of the doppler radar velocity sensor. A signal combiner (38, 40) combines the output of the processor with the output of the doppler velocity sensor to derive a corrected output signal which is more closely indicative of the velocity of the vehicle.

15 Claims, 8 Drawing Figures

DOPPLER SPEED SENSING APPARATUS

BACKGROUND AND FIELD OF THE INVENTION

The present invention relates to ground vehicle speed measuring apparatus and more particularly to apparatus for removing spurious signal components from the output of a doppler radar ground vehicle speed sensing system.

Many types of ground vehicles employ speedometers coupled into the drive train of the vehicle for measuring their ground velocity. This speed measuring technique, however, presumes that there is a known and unchanging correlation between speed of the drive train and speed of the vehicle. Consequently, it will provide an accurate speed measurement only if the vehicle wheels neither slip nor substantially change in radius throughout their working life. The occurrence of either of these conditions will introduce unknown errors into the speed measurements. In railroad vehicles, for example, the diameter of the wheel may wear by as much as several inches throughout its operating life. The relationship between the rotational speed of the wheel axle and the ground speed of the vehicle will therefore also change throughout the life of the wheel. In other applications, such as farm tractors, all-terrain vehicles, etc., substantial wheel slip occurs such that again the rotational velocity of the drive train cannot be directly correlated to the ground velocity of the vehicle.

Doppler radar velocity sensors have been used in some applications to provide a more direct measurement of the speed of the ground vehicle. In these applications a radio frequency (RF) signal is transmitted towards, and reflected from, the ground over which the vehicle is passing. The shift in frequency of the reflected signal relative to the transmitted signal is indicative of the ground velocity of the vehicle. Patents disclosing systems employing this approach include Augustine, U.S. Pat. No. 3,833,906, Augustine et al., U.S. Pat. No. 3,859,660, Clorfeine, U.S. Pat. No. 4,050,071 and Caplan, U.S. Pat. No. 4,107,680.

While the foregoing doppler velocity measurement technique is immune to wheel slip, wheel wear and associated problems, it nonetheless suffers from problems of its own. Doppler radar measurement systems which employ only a single doppler sensor rely upon the boresight of the receiving antenna associated with the doppler velocity sensor having a preestablished angular orientation with respect to the ground. Changing pitch of the vehicle causes this angular orientation to vary, however, thereby introducing errors into the velocity measurement. The aforementioned patents address this problem by providing two doppler velocity sensors, pointed in different directions, and circuitry for combining the outputs of the sensors so as to compensate to some extent for pitch of the vehicle.

Additional error components are introduced by the substantial and widely varying linear and angular accelerations which some types of vehicles encounter as they maneuver over broken ground. This is particularly true of off-the-road vehicles such as farm tractors which must regularly navigate quite rough and uneven terrain. The irregular linear and angular accelerations which the vehicle undergoes as it passes over such terrain introduces substantial spurious components into the doppler output which may in some circumstances completely mask the desired linear velocity measurement.

In aircraft navigational systems employing doppler radar to detect ground velocity, inertial platforms have in the past been provided for sensing pitch, roll and yaw of the aircraft and for then correcting the doppler output in accordance therewith. Patents relating to such systems include the patent to Parr et al., U.S. Pat. No. 3,028,592, Tholey et al., U.S. Pat. No. 3,462,586 and Gray, U.S. Pat. No. 3,810,176.

The inertial system described in the Parr et al. patent uses several accelerometers mounted on a gyroscopically stabilized platform to generate navigational data. The inertial system interacts with a doppler radar system in varying degrees, depending upon the operational mode of the apparatus.

SUMMARY OF THE INVENTION

The present invention employs an accelerometer mounted to sense accelerations along the boresight of a doppler radar velocity sensor. The output of the accelerometer is processed to provide a signal which corresponds essentially to the spurious components of the output of the doppler radar sensor. This spurious component signal is then combined with the doppler output signal to derive a corrected output signal which is more closely indicative of the linear velocity of the ground vehicle.

This type of spurious signal cancellation may be used in systems employing one or more doppler velocity sensors.

BRIEF DESCRIPTION OF THE DRAWINGS

The foregoing and other aspects and advantages of the present invention will become more readily apparent from the following detailed description, as taken in conjunction with the accompanying drawings, wherein.

DETAILED DESCRIPTION

Figure 1:
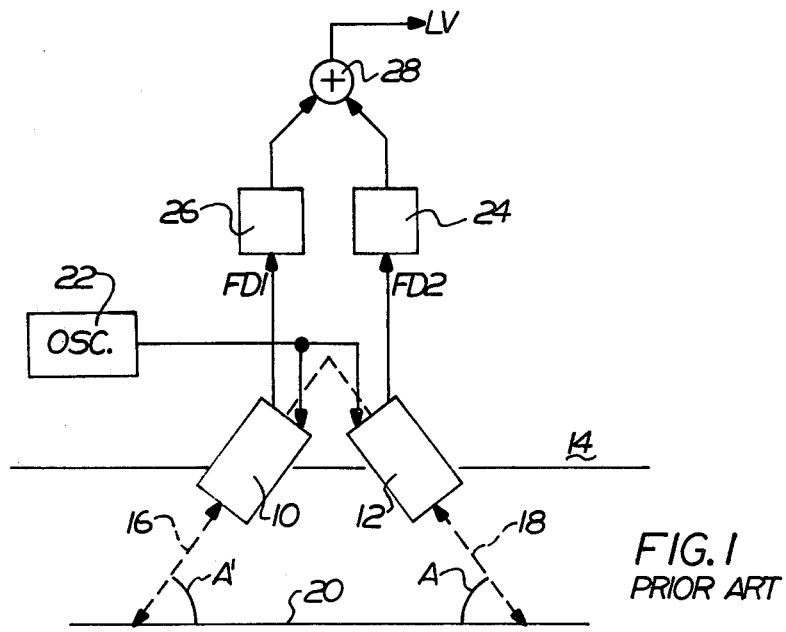
FIG. 1 is a diagram illustrating the orientation of two doppler radar velocity sensors with respect to the ground vehicle and the ground, in accordance with the teachings of the prior art.

FIG. 1 is a broad block diagram of a prior art doppler velocity sensor system employing two doppler velocity sensors 10 and 12 attached to a vehicle 14 in a back-to-back configuration. The two doppler velocity sensors 10 and 12 each include a single antenna for both receiving and transmitting RF electromagnetic energy along a respective boresight 16 and 18, a transmitter, a receiver, and associated signal mixing circuitry. These elements are all entirely conventional and are not shown in detail for this reason. In the FIG. 1 embodiment, a single RF oscillator circuit 22 is provided for generating the RF carrier signal which is transmitted by both doppler velocity sensors 10 and 12.

In operation, each of the doppler velocity sensors will transmit the RF signal generated by the oscillator 22 along its associated boresight 16 or 18, and will receive the signal reflected from the ground 20 along the same path. Due to the well-known doppler effect, the frequency of the return signal will differ from the frequency of the transmitted signal by an extent which is directly dependent upon the velocity of the reflecting object (in this case, the ground) along the boresight of the antenna. Motion of the reflecting object in a direction perpendicular to the boresight of the doppler velocity sensor will have no influence upon the frequency of the return signal.

The doppler velocity sensors 10 and 12 each demodulates its respective received signal by mixing it with the carrier signal provided by oscillator 22 so as to derive a corresponding doppler signal (FD1, FD2). Each doppler signal is an alternating current (AC) signal having a frequency which is equal to the difference in frequency of received and transmitted signals, and therefore is directly dependent upon the velocity, measured along the boresight, of the object which reflected the RF carrier signals. These two doppler signals FD1 and FD2 are provided to respective frequency counters 26 and 24. The counters generate signals indicative of the frequencies of the signals applied to the counter inputs. The counter signals are combined in an adder 28, which adds them as to derive a sum signal LV indicative of the linear velocity of the vehicle 14 with respect to the ground 20.

Since the doppler velocity sensor is sensitive only to motion along it boresight, and since the boresights of the doppler velocity sensors are not aligned with the velocity vector of the vehicle, the output signals provided by the individual doppler velocity sensors will represent only one component of the vehicle's linear velocity.

The doppler output signals can nonetheless be used to represent vehicle velocity, however, as long as the orientation between the vehicle's velocity vector and the doppler sensor's boresight remains constant. Unfortunately, this orientation changes. The "Janus" configuration shown in FIG. 1 was adopted to minimize the influence of orientation changes on the accuracy of velocity measurements provided by the system.

Figure 2A:
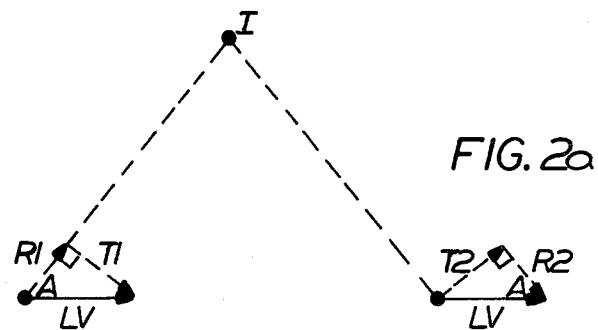
FIGS. 2A and 2B are vector diagrams useful in understanding the nature and origin of the spurious and linear velocity components of the doppler velocity sensor output signal.

Referring to FIG. 2A, it can be seen that the linear velocity vector LV of the vehicle 14 may be resolved into two orthogonal components at the intersection of each boresight 16, 18 with the surface of the ground 20. One component (R1, R2) at each boresight is aligned with the boresight and the other (T1, T2) is perpendicular thereto. Moreover, the magnitude of the respective components (R1, R2; T1, T2) of the two boresights will be equal as long as the two doppler velocity sensors are oriented at a common angle A with respect to the ground 20.

It will be noted that the relative magnitudes of each two components R and T of the linear velocity vector LV will vary in dependence upon the angle A between the boresight of the doppler velocity sensor and the ground. Thus, the velocity measured by each doppler velocity sensor will change if the angle A changes, even though the linear velocity LV of the vehicle has remained the same. When the outputs of the two doppler velocity sensors are added together, however, the changes in the outputs of the two sensors offset one another, producing an output which is relatively insensitive to variations in the angle A. For example, if the vehicle pitches such that the angle A between the boresight 18 of doppler velocity sensor 12 and the ground 20 diminishes, the angle A' between the boresight 16 of the doppler velocity sensor 10 and the ground 20 will increase. Thus, whereas the magnitude of the vector R1 will diminish, the magnitude of vector R2 will increase. The sum of R1 and R2 will thus remain essentially constant.

Other error components are introduced by types of vehicle motion other than pitch, however. Rotational motion of the vehicle will also occur in the yaw and roll axes, introducing other spurious signal components. If the rotation has a rotational center which coincides with the intersection I of the boresight of the two doppler velocity sensors 10 and 12, then the rotational motion will of necessity be perpendicular to the boresights, and hence will not appear in the output of the doppler velocity sensors. Unfortunately, vehicles such as farm tractors, which operate over very broken terrain, undergo angular accelerations about varying rotational centers, many of which are substantially displaced from the intersection I of the boresights of the two doppler velocity sensors.

Figure 2B:
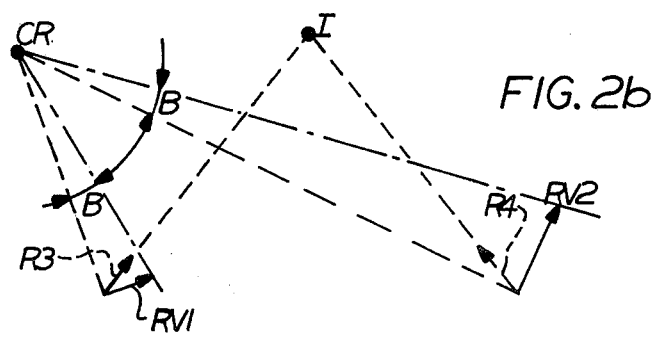

FIG. 2B illustrates one such rotational component. In this Figure, the vehicle 14 is undergoing an angular rotation B about a center of rotation CR which is displaced from the intersection I of the boresights of the two doppler velocity sensors. The angular rotation results in a rotational velocity component RV1 at the point of ground intersection of the boresight 16 and a rotational velocity component RV2 at the point of ground intersection of the boresight 18. The two rotational velocity components RV1 and RV2 can be resolved, again, into components parallel and perpendicular to the boresight, with the components parallel to the boresights being represented in FIG. 2B by the vectors R3 and R4. It will be noted that the two parallel components are of unequal magnitude. Because they are unequal, addition of the two signal components by the adder 28 will not result in their cancellation.

Rotational motion of the foregoing type is caused by bouncing of the vehicle and is, therefore, oscillatory. The spurious signal component included in the output of the adder 28 will therefore similarly be of an AC nature. It is, in theory, possible to filter out the AC signal component without losing the DC component which represents the linear velocity of the vehicle. In practice, however, filtering of the signal provided by the signal processor 24 introduces unacceptable time delays, and may prevent the processor's output from closely tracking the actual linear velocity of the vehicle during acceleration and deceleration.

Figure 3:
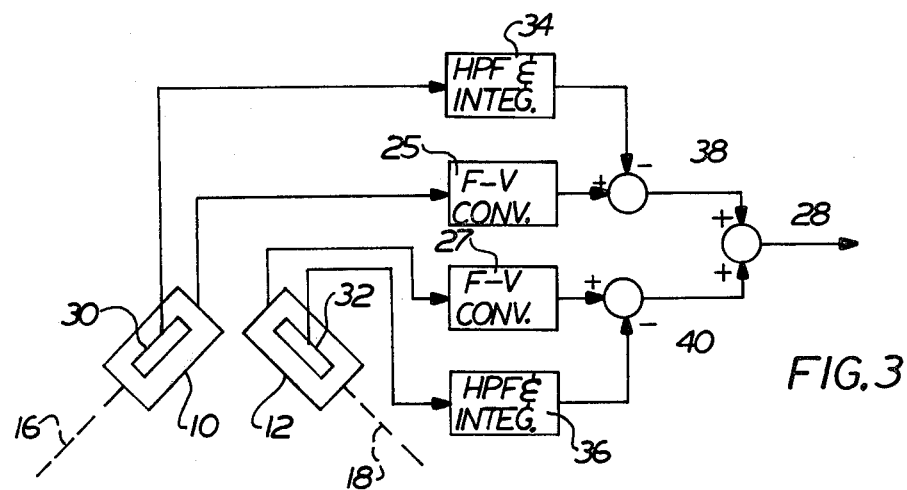
FIG. 3 is a block diagram generally illustrating a doppler velocity measurement system employing the spurious signal cancellation techniques of the present invention.

In accordance with the present invention, spurious signal components caused by rotational motion of the vehicle are cancelled by first isolating them from the linear velocity component, and then combining them with the output of the doppler signal processor so as to cancel them from the output. FIG. 3 illustrates a velocity sensing system employing doppler velocity sensors as illustrated in FIG. 1, but employing the spurious signal cancellation techniques of the present invention.

As in the FIG. 1 embodiment, the FIG. 3 embodiment includes two doppler velocity sensors 10 and 12. These doppler velocity sensors may be of the type disclosed with respect to FIG. 1, which sense doppler shift of an RF signal, or may instead sense doppler shift of an acoustical signal, light signal, etc. The doppler signal outputs are provided to respective frequency-to-voltage converters 25 and 27. The outputs of the two frequency-to-voltage converters 25 and 27 are analog voltages representative of the velocity of the vehicle, as measured along the boresight of the respective doppler velocity sensor. It should be noted that the analog signals represents the magnitude and not the direction of the velocity. Consequently, if the vehicle to which the velocity sensors are attached is travelling smoothly along the ground, the outputs of both frequency-to-voltage converters will be the same. This is because the velocity components as measured along the boresights of the respective doppler velocity sensors are equal in magnitude, although opposite in direction.

To eliminate the spurious signal components from the analog signals provided at the outputs of the frequency-to-voltage converters 25 and 27, each of the doppler velocity sensors 10 and 12 has associated with it an accelerometer 30 or 32. Each accelerometer 30 and 32 is disposed with respect to its associated doppler velocity sensor so as to sense accelerations along the boresight of the velocity sensor. Thus, the doppler velocity sensor 10 has a boresight 16 and the accelerometer 30 is disposed so that its line of action coincides with the boresight 16. The accelerometer will provide an output signal which is directly indicative of linear accelerations along the line of action. The accelerometer 30 is essentially insensitive to accelerations in a direction perpendicular to the line of action. The accelerometer output signals are each processed in a corresponding signal processor 34 and 36.

The acclerometers 30 and 32 should have a frequency response which is broad enough to encompass the expected frequencies of angular accelerations which the vehicle undergoes, it being appreciated that vehicles of different sizes and constructions will have different rates of angular accelerations. It is presently preferred that an accelerometer be employed which is of the type wherein a mass is mounted on a resilient diaphram, with movements of the mass being sensed to provide an indication of acceleration.

Acceleration indications may be converted into velocity indications by integrating them, since acceleration is the derivitive of velocity. Consequently, if the outputs of the accelerometers 30 and 32 were integrated, the results of the integration process should be signals which exactly match the velocity measurements provided by the respectively associated doppler sensor 10 or 12. Before integrating the accelerometer output signals, however, the signal processors 34 and 36 first filter them to eliminate the DC and low frequency components therefrom, which DC and low frequency components represent the linear velocity component of the vehicle. After this high-pass filtering, only the AC portion of the acceleration signal remains. It is this AC portion, however, which was produced by oscillatory accelerations of the vehicle along the boresight of the respectively associated doppler velocity sensor. The accelerometer signal processing circuits 34 and 36 integrate these high-pass filtered signals to produce output signals representative of the velocity variations introduced by these oscillatory accelerations. These output signals therefore match the spurious velocity component in the output of the associated frequency-to-voltage converter 25 and 27.

Preferably, the integrators associated with the accelerometer signal processors 34 and 36 will be reset to zero whenever the vehicle comes to rest. This is to prevent the buildup of cumulative error in the integrator. A sensor (not shown) may be coupled to a non-driven wheel for determining when the vehicle has halted. The reset signal is then generated after a short delay, inserted to insure that deceleration transients have passed.

For spurious signal cancellation, the output of each of the accelerometer signal processing circuits 34 and 36 is subtracted from the output of the corresponding frequency-to-voltage converter 25 and 27 in an associated signal subtractor circuit 38 and 40. The converters 25 and 27 and the processing circuits 34 and 36 will be designed to have gains such that each provides an output which changes by the same amount in response to a sudden incremental velocity change. This matching of responses may be readily accomplished since the characteristics of the accelerometer and doppler sensors will be known, and since the gains of the processing circuits and converters are within the control of the designer. With the responses thus equalized, each accelerometer output will match the spurious component in the output of the corresponding converter, thereby affording optimum signal cancellation.

The outputs of the signal subtractors are combined in a signal adder circuit 28, as in prior art embodiments. The sum signal derived by the signal adder circuit 28 corresponds to the linear velocity component of the vehicle to which the speed sensing system is attached, and includes a substantially reduced spurious signal component.

Figure 4:
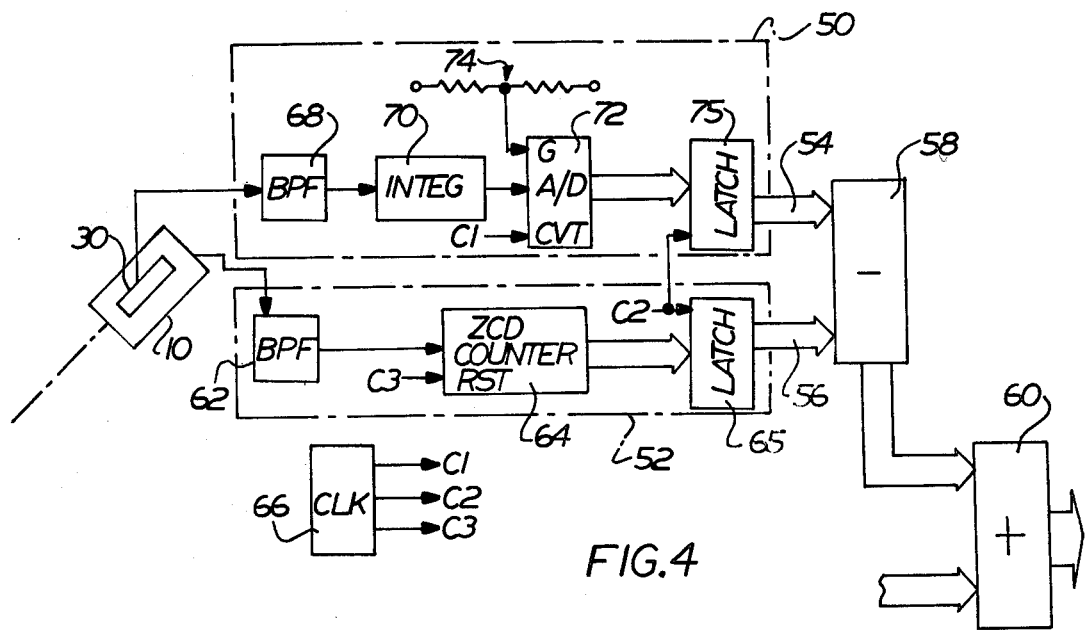
FIGS. 4, 5 and 6 are block diagrams of other embodiments of the doppler velocity measurement system of FIG. 3.
Figure 5:
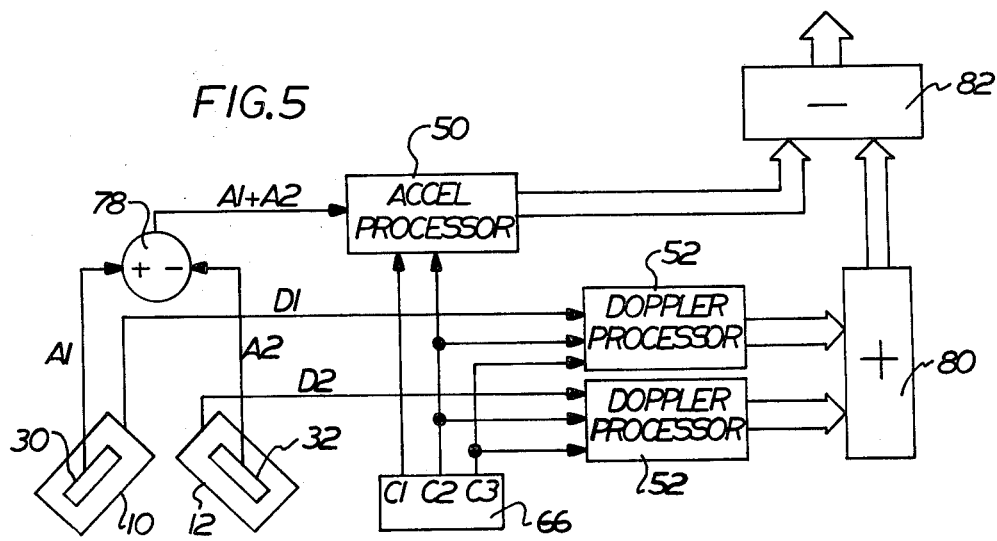

FIGS. 4 and 5 are block diagrams of embodiments where much of the signal processing is done with digital signals, rather than analog signals as in the FIG. 3 embodiment. In the FIG. 4 embodiment, signal processors 50 and 52 are provided for respectively processing the output signals provided by the accelerometer 30 and the doppler speed sensor 10. Similar signal processing circuits (not shown in FIG. 4) process the outputs of the other doppler velocity sensor 12 and its associated accelerometer 32. Each of the signal processing circuits 50 and 52 provides an associated multibit digital word at its output 54 and 56. As in the FIG. 3 embodiment, the outputs of the two signal processing circuits 50 and 52 are subtracted from one another by a subtractor 58, whose output is then added to the output of the subtractor for the other channel in a signal adder 60. Unlike the adders and subtractors of the FIG. 3 embodiment, the subtractor 58 and adder 60 are in this embodiment digital circuits which digitally perform the subtraction and addition functions.

In FIG. 4, the doppler signal processing circuit 52 includes a band-pass filter 62 to which the output of the doppler velocity sensor 10 is directed. This band-pass filter eliminates those frequencies which are artifacts of the doppler signal demodulation process carried out by the doppler velocity sensor 10. The output of the band-pass filter 62 is directed to a zero crossing detector (ZCD) and counter circuit 64 which counts the number of zero crossings occurring over a fixed interval. This number is directly related to the frequency of the signal, since higher frequencies will have higher numbers of zero crossings and lower frequencies will have lower numbers of zero crossings.

The interval over which zero crossings are counted is set by one phase (C3) of a clock provided by a clock circuit 66, wherein the regularly occurring clock pulses are directed to the reset input of the zero crossing detector/counter circuit 64, such that each of the pulses of the clock signal resets the counter therein to a zero state. During the interval between successive reset signals, the counter accumulates a count identifying the number of zero crossings which have occurred since the last reset pulse. The count contained within the counter 64 immediately prior to being reset by the next succeeding reset clock pulse is directly indicative of the doppler frequency. The count contained within the counter 64, in the form of a multibit binary word, is provided in parallel to a digital latch circuit 65 which will store the count upon the application of a different phase clock signal (C2) thereto. A pulse appears upon the C2 clock line immediately preceding the C3 reset pulse. Thus, the count stored in the latch circuit 65 is updated at the conclusion of each counting period of counter 64. The stored count signal is applied upon the output line 56 to the digital signal subtractor 58.

In FIG. 4, the accelerometer signal processing circuit 50 is shown with the band-pass filter and the integrator circuits represented by separate blocks 68 and 70. The function of these elements has been described previously with respect to the block 34 of the FIG. 3 embodiment. The output of the integrator 70 is an analog signal representing the spurious velocity component. In order to convert this analog signal into a digital signal for use in the remainder of the circuitry, the analog output of the integrator 70 is applied to the analog input of an analog-to-digital (A/D) converter 72. A third phase clock signal (C1), again generated by the clock circuit 66, is directed to the "convert" input of the converter 72. With the appearance of each clock pulse at the convert input, the analog/digital converter will generate a digital signal having a value directly indicative of the magnitude of the analog signal provided at the output of the integrator 70.

The converter 72 may take any conventional form. In some cases it may be cost-effective to utilize a voltage-to-frequency converter followed by a frequency measuring circuit similar to the doppler signal processor.

The proportionality factor between the magnitude of the analog signal provided by integrator 70 and the value of the digital signal provided by converter 72 (i.e., the gain of the converter 72) is determined by a resistive divider 74 which provides a gain control signal to the gain input of the converter 72. The resistive divider 74 is designed such that the magnitude of the spurious signal component represented by the output of A/D converter 72 corresponds to the magnitude of the same spurious signal component in the output of the ZCD counter 64. As with the embodiment of FIG. 3, the appropriate gain setting may be readily determined since the response characteristics of the other elements of the system will be known.

The multibit digital word provided at the output of the A/D converter 72 is supplied to another latch circuit 75 whose latching function is again controlled by the C2 phase clock signals provided by clock circuit 66. Consequently, latch circuits 75 and 65 will simultaneously latch outputs provided respectively by A/D converter 72 and ZCD counter 64. The output 54 of latch circuit 75 is directed to the other input of the digital signal subtractor 58, as described previously.

To summarize the sequence of operations, the zero crossing detector/counter circuit 64 will count doppler signal zero crossings during the period between successive reset pulses on the C3 clock line. Near the conclusion of a given counting period, a pulse will sequentially appear on first the C1, then the C2, and finally the C3 clock lines. The C1 pulse will trigger the A/D converter 72 to first provide a digital representation of the output of the integrator 70. The C2 pulse will then cause the latch circuits 75 and 65 to latch the outputs of the converter 72 and the counter 64. Finally, the counter 64 is reset by the C3 pulse in preparation for the next counting period. The same three clock phases C1, C2 and C3 are provided to the corresponding inputs of the corresponding elements of the circuits which process the outputs of the second doppler velocity sensor and its associated accelerometer.

FIG. 5 illustrates a second embodiment, eliminating the need for one of the two accelerometer signal processing circuits 50 employed in the FIG. 4 embodiment. This result is achieved by first subtracting the outputs of the two accelerometers 30 and 32 in an analog signal subtracting circuit 78. The analog output of this signal subtractor is then supplied to a single accelerometer processor 50 having substantially the form illustrated in FIG. 4.

As in the FIG. 4 embodiment, the output of each of the doppler velocity sensors 10 and 12 is processed in a corresponding doppler processor 52, each of which may have the same form as the doppler signal processor 52 of FIG. 4. The outputs of the processors 52 are then combined in a digital adder circuit 80 to produce a signal indicative of velocity along the direction of travel of the vehicle, but including the spurious signal components which are to be cancelled. The spurious signal components are cancelled by subtracting the output of the accelerometer processor 50 from the output of the adder circuit 80 in a digital subtractor circuit 82. The output of the digital subtractor circuit 82 will correspond to the linear velocity component of the vehicle, and will be substantially the same as the output provided by the circuit of 54. The apparatus of FIG. 5 accomplishes the derivation of the signal, however, through use of only a single accelerometer processor 50, rather than the two required in the FIG. 4 embodiment.

Figure 6:
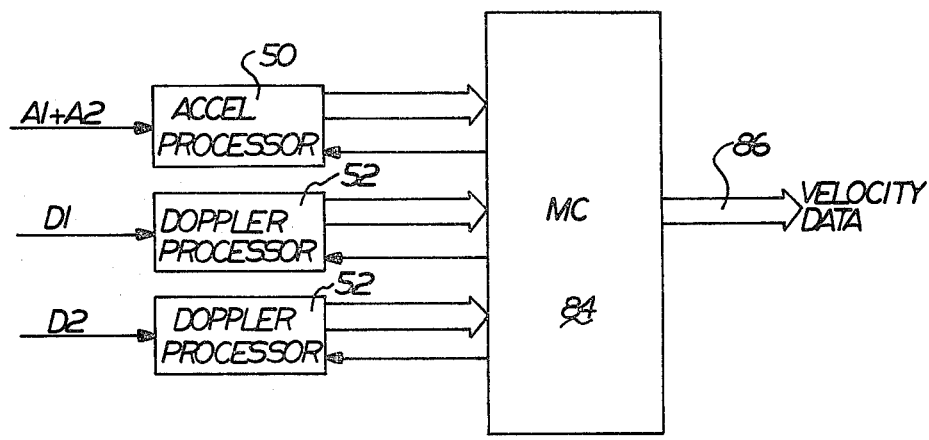

Of course, a microcomputer may be utilized in the digital embodiments of FIGS. 4 and 5 to supplant much of the digital signal manipulation circuitry. An embodiment incorporating this approach is shown in FIG. 6. The microcomputer 84 of this embodiment responds to and controls the accelerometer and doppler processors, replacing the digital adders and subtractors as well as the three phase clock of FIG. 5. At the conclusion of each periodic interval of time, the microcomputer reads the outputs of all three processors, adds the outputs of the two doppler processors, scales the output of the accelerometer processor appropriately, subtracts the scaled accelerometer processor output from the sum of the two doppler processor outputs, and outputs the result on an output bus 86.

Figure 7:
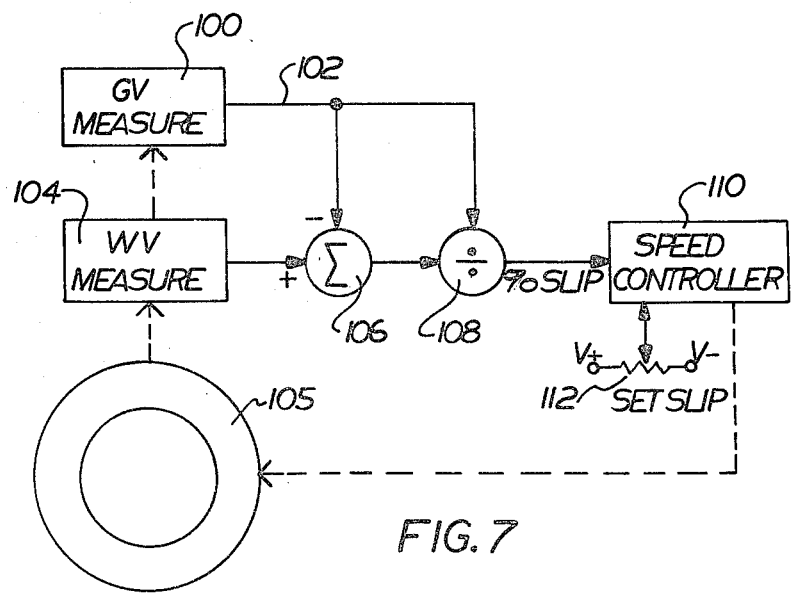
FIG. 7 is a block diagram of a vehicle speed controller employing the output signals provided by the velocity measurement systems in accordance with the present invention.

FIG. 7 illustrates a vehicle speed control system employing a true ground speed velocity measurement circuit such as described above. The function of this circuit is to determine the percentage of wheel slip, and to then control the wheel speed such that the measured wheel slip approximates a desired amount of wheel slip. Patents disclosing prior art wheel slippage and control systems include Carlson, U.S. Pat. No. 3,834,481 and Bachman, U.S. Pat. No. 4,086,563.

A ground velocity measurement circuit 100, taking the form described previously with respect to FIGS. 3–6, is provided for generating a signal (which in this example is analog in nature) having a magnitude indicative of the true ground speed of the vehicle. This output signal, provided along an output line 102, is then subtracted from a second velocity signal indicative of the wheel velocity of the vehicle.

A wheel velocity measurement circuit 104 is provided which is directly responsive to motion of the vehicle wheels 105 as, for example, by means of a tachometer coupled into the drive train of the vehicle. The output of the wheel velocity measurement circuit 104 will be a signal (which again is an analog signal) having a value indicative of the wheel velocity of the vehicle. The wheel velocity will in general be somewhat greater than the true ground velocity of the vehicle, due to slip of the wheels. This is particularly true where the driven vehicle is passing over a loose granular surface, a wet surface, or where the ground is so broken that wheel bounce causes the wheels to lose contact with the ground for some portion of time.

Signal subtractor 106 subtracts the ground velocity measurement provided by the circuit 100 from the wheel velocity measurement provided by the circuit 104. The output of the signal subtractor 106 is a signal having a value indicative of the amount of wheel slip. In order to convert this into a measurement of percent of wheel slip, an analog divider circuit 108 is provided. This analog divider divides the output of the signal subtractor 106 (indicating absolute wheel slip) by the output of the measurement circuit 100 (indicating true ground speed).

The output of the analog divider 108, having a value indicative of the percent of wheel slip, is supplied to a set point speed controller 110 where it is compared with a desired slip value, as indicated by the setting of a potentiometer 112. The speed controller 110 will control the speed of the prime mover (generally an internal combustion engine) such that the percent slip indicated at the output of the analog divider 108 approximates the desired degree of slip as indicated by the setting of the potentiometer 112. If the actual wheel slip is greater than desired, the speed controller 110 will diminish the wheel velocity, whereas if the percent slip is below the desired value, the speed controller will increase the wheel velocity. In this fashion, the speed of the vehicle is automatically adjusted to the speed producing the desired amount of wheel slip.

Although the invention has been described with respect to a preferred embodiment, it will be appreciated that various rearrangements and alterations of parts may be made without departing from the spirit and scope of the present invention, as defined in the appended claims.

What is claimed is:

1. In a speed sensing system wherein a doppler velocity sensor is used to determine the velocity of a vehicle and provides a doppler output signal indicative of movement of the vehicle relative to the ground along the boresight of said doppler velocity sensor, the improvement comprising:
    accelerometer means for sensing accelerations of said vehicle along the boresight of said doppler velocity sensor and insensitive to accelerations perpendicular to said boresight, said means providing an accelerometer output signal indicative of only said accelerations along said boresight,
    processing means for processing said accelerometer output signal to derive a velocity error signal indicative of vehicle velocity components other than a velocity component of interest, and
    means for combining said velocity error signal with said doppler output signal to derive a corrected output signal indicative of said velocity component of interest.

2. The improvement of claim 1, wherein said processing means comprises D.C. blocking means for eliminating D.C. components from said accelerometer output signal to provide an A.C. accelerometer output signal indicative of only oscillatory accelerations of said vehicle relative to the ground along the boresight, and converter means for converting said A.C. accelerometer output into an A.C. velocity output, said A.C. velocity output representing said velocity error signal.

3. The improvement of claim 2, wherein said converter means comprises an integrator for integrating said A.C. accelerometer output to provide an integrated signal representing said A.C. velocity output.

4. In a speed sensing system wherein first and second doppler velocity sensors are used to determine the velocity of a vehicle by each providing a doppler output signal indicative of movement of the vehicle relative to the ground along its respective boresight, which doppler output signals are combined to form the velocity indication signal, the improvement comprising:
    first and second accelerometer means for sensing accelerations of said vehicle along the boresight of said first and said second doppler velocity sensor respectively, each accelerometer means being insensitive to accelerations perpendicular to its respective boresight and thus providing an accelerometer output signal indicative of only the accelerations along said boresight,
    processing means for processing said accelerometer output signals to derive at least one velocity error signal indicative of vehicle velocity components other than a velocity component of interest, and
    first means for combining said doppler output signals and said at least one velocity error signal to derive a corrected velocity indication signal representative of said velocity component of interest.

5. The improvement of claim 4, wherein said processing means comprises first and second individual accelerometer processing means for processing the accelerometer output signal provided by the first and the second accelerometer means, respectively, to derive first and second velocity error signals indicative of vehicle velocity components along the boresights of the first and second doppler velocity sensors other than the velocity component of interest.

6. The improvement of claim 5, wherein said first combining means comprises first and second error signal combining means for combining the first and second velocity error signals with the first and second doppler output signals, respectively, so as to provide first and second corrected doppler output signals, and means for combining the first and second corrected doppler output signals to derive said corrected velocity indication signal.

7. The improvement of claim 4, wherein said processing means comprises second combining means for combining the accelerometer output signals provided by said first and second accelerometer means to provide a combined accelerometer output signal, and means for processing said combined accelerometer output signal to derive a velocity error signal indicative of vehicle velocity components other than the velocity component of interest.

8. In a method of sensing the speed of a vehicle wherein a doppler velocity sensor provides an output signal indicative of the velocity of relative movement between the vehicle and the ground along the boresight of the sensor, the improvement comprising the steps of:

sensing accelerations along the boresight of said doppler velocity sensor and providing an acceleration signal which varies only with said accelerations along the boresight, processing said acceleration signal to provide a processed signal which varies in accordance with velocity components other than a velocity component of interest, and combining said processed signal with said doppler output signal to derive a corrected output signal indicative of said velocity component of interest.

9. Apparatus as set forth in claim 1, wherein said accelerometer means comprises an accelerometer which is sensitive to only those accelerations occurring along a defined line of action, said accelerometer being disposed so that said line of action is parallel to said boresight.

10. Apparatus as set forth in claim 9, wherein said accelerometer is of the type which includes a diaphram having a mass suspended therein.

11. Apparatus as set forth in claim 1, wherein said combining means comprises means for subtracting said velocity error signal from said doppler output signal to provide a difference signal, said difference signal representing said corrected output signal.

12. Apparatus as set forth in claim 4, wherein said accelerometer means comprises an accelerometer which is sensitive to only those accelerations occurring along a defined line of action, said accelerometer being disposed so that said line of action is parallel to said boresight.

13. Apparatus as set forth in claim 4, wherein said accelerometer is of the type which includes a diaphragm having a mass suspended therein.

14. Apparatus as set forth in claim 4, wherein said combining means comprises means for subtracting said velocity error signal from said doppler output signal to provide a difference signal, said difference signal representing said corrected output signal.

15. In a speed sensing system wherein a doppler velocity sensor is used to determine the velocity of an automobile or other land vehicle and provides a doppler output signal indicative of movement of the vehicle relative to the ground along the boresight of said doppler velocity sensor, the improvement comprising:

a linear accelerometer disposed with its line of action parallel to the boresight of said doppler velocity sensor, so as to thus be sensitive to only those accelerations which are parallel to said boresight, said accelerometer providing an accelerometer output signal indicative of only said accelerations, filter means for filtering said accelerometer output signal to eliminate DC and low frequency components therefrom and thereby provide an AC accelerometer output signal indicative of only oscillatory accelerations of said vehicle relative to the ground along said boresight, integrator means for integrating said AC accelerometer output signal to provide an AC velocity output signal, and means for subtracting said AC velocity output signal from said doppler output signal to derive a corrected output signal indicative of the velocity of said automobile or other land vehicle.

* * * * *